United States Patent
Shimizu

(10) Patent No.: US 8,665,481 B2
(45) Date of Patent: *Mar. 4, 2014

(54) IMAGE PROCESSING SYSTEM, INFORMATION PROCESSING APPARATUS, IMAGE PROCESSING APPARATUS, CONTROL METHOD THEREFOR, AND COMPUTER PROGRAM

(71) Applicant: Canon Kabushiki Kaisha, Tokyo (JP)

(72) Inventor: Takayuki Shimizu, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,185

(22) Filed: Nov. 2, 2012

(65) Prior Publication Data
US 2013/0057919 A1 Mar. 7, 2013

Related U.S. Application Data

(63) Continuation of application No. 12/024,304, filed on Feb. 1, 2008, now Pat. No. 8,334,998.

(30) Foreign Application Priority Data

Feb. 1, 2007 (JP) ................................ 2007-023514

(51) Int. Cl.
| | |
|---|---|
| H04N 1/60 | (2006.01) |
| G06F 3/00 | (2006.01) |
| G06F 3/12 | (2006.01) |
| G06K 15/02 | (2006.01) |
| H04N 1/00 | (2006.01) |
| H04N 1/46 | (2006.01) |

(52) U.S. Cl.
USPC ........... 358/1.15; 358/1.9; 358/501; 358/505; 358/523; 358/524; 358/401; 358/403

(58) Field of Classification Search
None
See application file for complete search history.

(56) References Cited

U.S. PATENT DOCUMENTS

| | | | |
|---|---|---|---|
| 6,906,829 B1 | 6/2005 | Kisono | |
| 7,395,029 B2 | 7/2008 | Sasai et al. | |
| 7,463,151 B1 | 12/2008 | Schulte-Kellinghaus | |
| 7,493,128 B2 | 2/2009 | Tang et al. | |
| 7,546,496 B2 | 6/2009 | Koyanagi et al. | |
| 8,334,998 B2 * | 12/2012 | Shimizu .................... | 358/1.15 |

(Continued)

FOREIGN PATENT DOCUMENTS

| | | |
|---|---|---|
| JP | 9-297668 A | 11/1997 |
| JP | 2004-364002 A | 12/2004 |

*Primary Examiner* — King Poon
*Assistant Examiner* — Beniyam Menberu
(74) *Attorney, Agent, or Firm* — Rossi, Kimms & McDowell LLP

(57) ABSTRACT

An information processing apparatus acquires communication setting information for communicating with an image processing apparatus by a second communication unit via a first communication unit. In accordance with the acquired communication setting information, communication by the second communication unit is established to execute, via the second communication unit, an image processing service provided by the image processing apparatus. When establishment of communication is detected, an operation window display request for executing the image processing service is transmitted via the second communication unit. The image processing apparatus receives the operation window display request from the information processing apparatus via the second communication unit. In accordance with the received operation window display request, an operation window for executing the image processing service is displayed. Image processing for input image data is executed on the basis of the settings set via the displayed operation window.

9 Claims, 14 Drawing Sheets

(56) References Cited

U.S. PATENT DOCUMENTS

| | | |
|---|---|---|
| 2002/0000470 A1 | 1/2002 | Lanzaro et al. |
| 2002/0036796 A1 | 3/2002 | Kurozasa et al. |
| 2002/0039194 A1 | 4/2002 | Nakao et al. |
| 2003/0203744 A1* | 10/2003 | Otsuka .................. 455/551 |
| 2004/0048621 A1 | 3/2004 | Takahashi et al. |
| 2004/0078395 A1 | 4/2004 | Rinkevich et al. |
| 2004/0227979 A1* | 11/2004 | Chen ......................... 358/474 |
| 2004/0259539 A1 | 12/2004 | Ayatsuka et al. |
| 2004/0266347 A1 | 12/2004 | Palin et al. |
| 2005/0108547 A1 | 5/2005 | Sakai |
| 2005/0190399 A1 | 9/2005 | Nakaoka et al. |
| 2005/0221813 A1 | 10/2005 | Rajahalme et al. |
| 2005/0248803 A1 | 11/2005 | Ohara |
| 2006/0126110 A1 | 6/2006 | Ohara et al. |
| 2006/0176509 A1 | 8/2006 | Aoki et al. |
| 2006/0209343 A1 | 9/2006 | Wanda et al. |
| 2007/0047005 A1 | 3/2007 | Kim |
| 2007/0124512 A1 | 5/2007 | Park |
| 2008/0020707 A1 | 1/2008 | Takayama et al. |
| 2008/0051032 A1* | 2/2008 | Hashimoto .............. 455/41.3 |
| 2008/0096486 A1 | 4/2008 | Whitten |
| 2008/0109643 A1* | 5/2008 | Nishida ..................... 712/225 |
| 2008/0171561 A1 | 7/2008 | Irony et al. |
| 2008/0186536 A1 | 8/2008 | Shimizu |
| 2008/0200118 A1 | 8/2008 | Kubo et al. |
| 2008/0220717 A1 | 9/2008 | Ayatsuka et al. |

\* cited by examiner

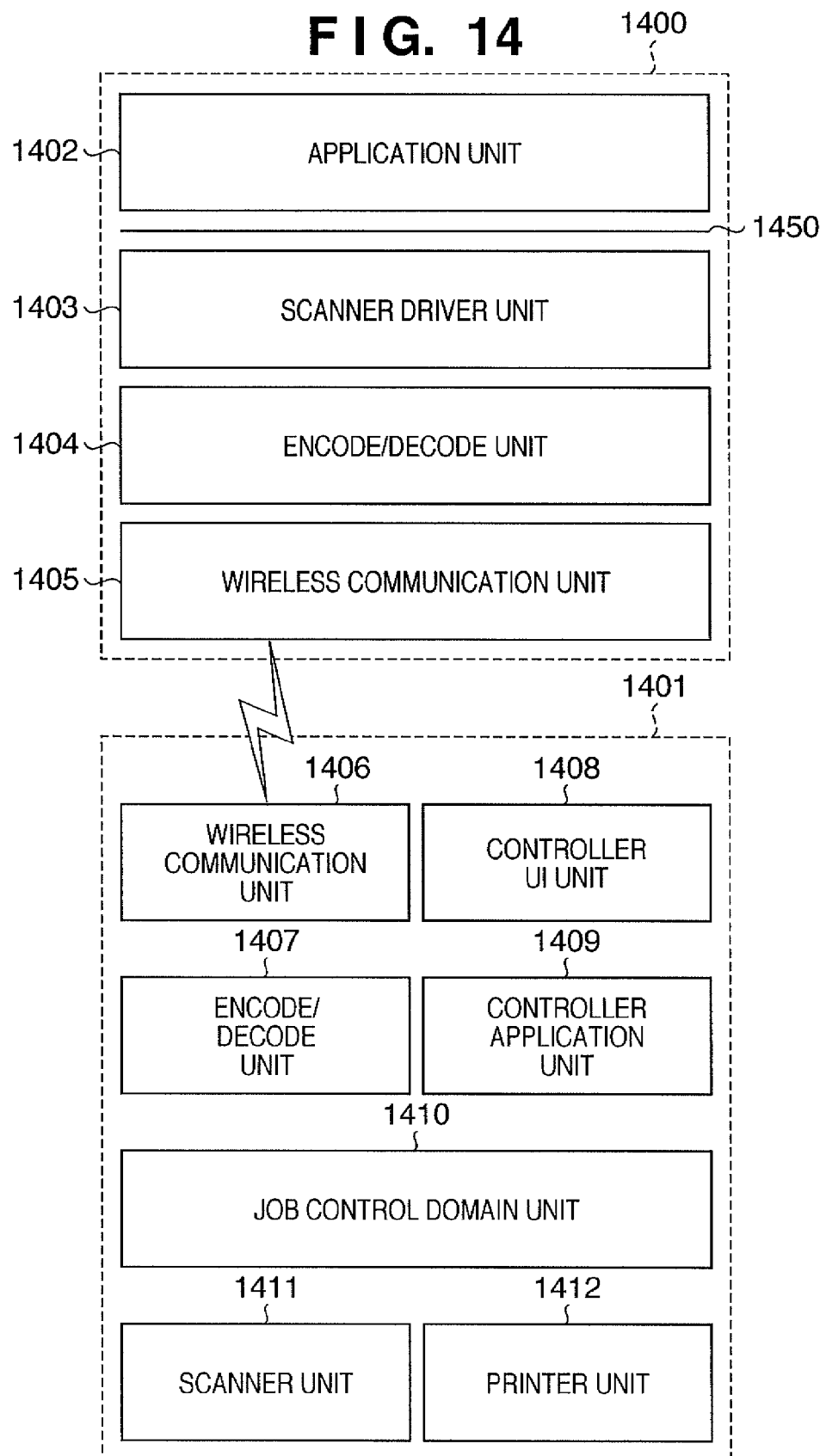

IMAGE PROCESSING SYSTEM, INFORMATION PROCESSING APPARATUS, IMAGE PROCESSING APPARATUS, CONTROL METHOD THEREFOR, AND COMPUTER PROGRAM

CROSS-REFERENCE TO RELATED APPLICATION

This application is a continuation of prior U.S. patent application Ser. No. 12/024,304, filed Feb. 1, 2008, the entire disclosure of which is hereby incorporated herein by reference.

BACKGROUND OF THE INVENTION

1. Field of the Invention

The present invention relates to an image processing system comprising an information processing apparatus and an image processing apparatus each including first and second communication units, an information processing apparatus, an image processing apparatus, a control method for them, and a computer program.

2. Description of the Related Art

Recently, proposals have been made to eliminate the complexity of cable connection in an image processing system which captures the image data obtained by scanning by an image processing apparatus such as a digital copying machine or a scanner apparatus from a handheld terminal such as a smart phone, a PDA, or a mobile PC.

For example, as shown in FIG. 13, such an image processing system comprises a handheld terminal 1300 and image processing apparatuses 1301, 1302, and 1303. These components can wirelessly communicate with each other using wireless communication techniques, such as Bluetooth or wireless LAN (IEEE802.11a/b/g or the like). There is no need to use a plurality of image processing apparatuses. Such apparatuses include, for example, a digital multifunction apparatus. When an operator selects a desired one of image processing apparatuses located in a communicable range, the handheld terminal 1300 communicates with the specific image processing apparatus.

FIG. 14 is a block diagram showing the functional arrangements of the handheld terminal and image processing apparatus in the image processing system in FIG. 13.

A handheld terminal 1400 corresponding to the handheld terminal 1300 comprises an application unit 1402, scanner driver unit 1403, encode/decode unit 1404, and wireless communication unit 1405. An image processing apparatus 1401 corresponding to each of the image processing apparatuses 1301 and 1302 comprises a wireless communication unit 1406, encode/decode unit 1407, controller UI unit 1408, controller application unit 1409, job control domain unit 1410, scanner unit 1411, and printer unit 1412.

The application unit 1402 is an application using the image data obtained by scanning. The application unit 1402 supplies a scan request to the scanner driver unit 1403 upon activating the scanner driver unit 1403 via an I/F (interface) 1450 (TWAIN, WIA, or the like) in accordance with operation by the operator. The scanner driver unit 1403 receives the scan request from the application unit 1402 and displays a setting window for scan setting.

The operator performs scan setting (a color mode, resolution, and the like) on the setting window which the scanner driver unit 1403 displays on the display of the handheld terminal 1400, and then performs operation for the execution of scanning. The scanner driver unit 1403 supplies scan job information conforming to the scan setting to the encode/decode unit 1404 in accordance with the operation of the execution of scanning by the operator. The encode/decode unit 1404 generates packet data conforming to the scan job information and transmits it to the image processing apparatus 1401 via the wireless communication unit 1405.

The handheld terminal 1400 and the image processing apparatus 1401 perform data communication by wireless communication via the wireless communication unit 1405 of the handheld terminal 1400 and the wireless communication unit 1406 of the image processing apparatus 1401. The encode/decode unit 1407 generates scan job information by analyzing the packet data received by the wireless communication unit 1406, and supplies the scan job information to the job control domain unit 1410.

The job control domain unit 1410 controls processing for a plurality of jobs such as a scan job, copy job, and print job. Upon receiving scan job information, the job control domain unit 1410 operates the scanner unit 1411 on the basis of the supplied scan job information. The scanner unit 1411 reads a document from a document feeder mounted on the image processing apparatus 1401, and stores the obtained image data in a storage device.

The job control domain unit 1410 supplies notification information indicating the generation and storage of image data to the encode/decode unit 1407. The encode/decode unit 1407 generates packet data in accordance with this notification information, and transmits the data to the handheld terminal 1400 via the wireless communication unit 1406.

In the handheld terminal 1400, upon receiving this notification information, the scanner driver unit 1403 transmits an image acquisition command to the image processing apparatus 1401. The scanner driver unit 1403 receives image data from the image processing apparatus 1401 as a response to the command, and supplies the image data to the application unit 1402 via the I/F 1450.

Note that the controller UI unit 1408 supplies input information corresponding to the operation by the operator to the controller application unit 1409, and also generates a display window for the information supplied from the controller application unit 1409 on the display. The controller application unit 1409 supplies job information such as a copy job, scan job, or transmit job to the job control domain unit 1410 in accordance with input information from the controller UI unit 1408. The printer unit 1412 is controlled by the job control domain unit 1410 to print image data.

Japanese Patent Laid-Open Nos. 09-297668 and 2004-364002 disclose conventional techniques. According to Japanese Patent Laid-Open No. 09-297668, it is determined whether a host apparatus and an image forming apparatus are connected to each other via a local interface or a network interface. In accordance with the determination result, print processing operations are switched to set an optimal image formation environment.

According to Japanese Patent Laid-Open No. 2004-364002, a computer transmits setting information indicating the contents of image processing to a handheld terminal via a local interface. The handheld terminal stores the setting information in its storage unit upon authentication of the user. When the user carrying the handheld terminal storing the setting information moves to near an MFP (image processing apparatus (multifunction apparatus)), the handheld terminal transmits the setting information to the MFP via the local interface upon authentication of the user. The MFP executes image processing on the basis of the received setting information.

In the conventional image processing system, however, the operator needs to select one of the image processing apparatuses located in the communicable range with which communication is to be performed. It is therefore impossible to make the most of the mobility and convenience of a handheld terminal capable of wireless communication with an image processing apparatus upon movement near to it. Furthermore, the operator is allowed to perform setting and operation for scanning only on a scanner driver window on the handheld terminal. This poses a problem that the operability on a relatively small operation window like that on a handheld terminal considerably deteriorates.

SUMMARY OF THE INVENTION

The present invention has been made in consideration of the above problems, and has its object to efficiently implement functional linkage between a handheld terminal and an image processing apparatus with simple operation in an image processing system comprising the handheld terminal and the image processing apparatus.

According to the first aspect of the present invention, an image processing system comprising an information processing apparatus and an image processing apparatus each comprising first communication means and second communication means, comprises:

the information processing apparatus comprises acquisition means for acquiring communication setting information for communicating with the image processing apparatus by the second communication means from the first communication means, establishing means for establishing communication by the second communication means to execute an image processing service from the image processing apparatus, via the second communication means in accordance with the communication setting information acquired by the acquisition means, detection means for detecting the establishment of communication by the establishing means, and transmission means for transmitting an operation window display request for executing the image processing service to the image processing apparatus via the second communication means when the detection means detects the establishment of communication, and the image processing apparatus comprises reception means for receiving the operation window display request from the information processing apparatus via the second communication means, display means for displaying an operation window for executing the image processing service in accordance with the operation window display request received by the reception means, and image processing means for executing image processing of input image data on the basis of settings set via the operation window displayed by the display means.

According to the second aspect of the present invention, an information processing apparatus which comprises first communication means and second communication means and communicates with an image processing apparatus, comprises:

acquisition means for acquiring communication setting information for communicating with the image processing apparatus by the second communication means from the first communication means;

establishing means for establishing communication by the second communication means to execute an image processing service from the image processing apparatus, via the second communication means in accordance with the communication setting information acquired by the acquisition means;

detection means for detecting the establishment of communication by the establishing means; and transmission means for transmitting an operation window display request for executing the image processing service to the image processing apparatus via the second communication means when the detection means detects the establishment of communication.

In a preferred embodiment, the transmission means transmits a job having an operation window display request for executing the image processing service as an attribute via the second communication means.

In a preferred embodiment, the apparatus further comprises service authentication means for acquiring service information indicating a service from the image processing apparatus via the first communication means and performing authentication to determine whether the service indicated by the service information is a service which can be communicated with the information processing apparatus, wherein the establishing means inhibits establishment of communication by the second communication means when the service indicated by the service information is not a service which can be communicated with the information processing apparatus.

In a preferred embodiment, the apparatus further comprises icon display means for, when a result of authentication by the service authentication means indicates that the service indicated by the service information is a service which can be communicated with the information processing apparatus, displaying a first icon indicating corresponding information, and when the service indicated by the service information is not a service which can be communicated with the information processing apparatus, displaying a second icon indicating corresponding information.

In a preferred embodiment, the first communication means and the communication means are wireless communication means having different communicable distance ranges, a first communicable distance range of the first communication means being smaller than a second communicable distance range of the second communication means, and the first communication means starts communication when a distance between the information processing apparatus and the image processing apparatus falls within the first communicable distance range.

In a preferred embodiment, the image processing service includes at least one of a scanner service, a print service, and a FAX service.

According to the third aspect of the present invention, an image processing apparatus which comprises first communication means and second communication means and communicates with an information processing apparatus, comprises:

reception means for receiving, from the information processing apparatus via the second communication means, an operation window display request for executing a service provided by the image processing apparatus;

display means for displaying an operation window for executing the image processing service in accordance with the operation window display request received by the reception means; and image processing means for executing image processing of input image data on the basis of settings set via the operation window displayed by the display means.

In a preferred embodiment, the reception means receives, via the second communication means, an operation window display request for executing the image processing service as an attribute, and the display means extracts the operation window display request in the job and displays the operation window.

In a preferred embodiment, the apparatus further comprises:

driver authentication means for acquiring, via the first communication means, driver information indicating a device driver installed in the information processing apparatus, and performing authentication to determine whether the driver indicated by the driver information is a driver which can be communicated with the image processing apparatus; and device port information setting means for, when a result of authentication by the driver authentication means indicates that the driver indicated by the driver information is a driver which can be communicated with the image processing apparatus, storing device port information used for communication with the device driver, and when the driver indicated by the driver information is not a driver which can be communicated with the image processing apparatus, storing no device port information used for communication with the device driver.

In a preferred embodiment, the first communication means and the communication means are wireless communication means having different communicable distance ranges, a first communicable distance range of the first communication means being smaller than a second communicable distance range of the second communication means, and the first communication means starts communication when a distance between the information processing apparatus and the image processing apparatus falls within the first communicable distance range.

In a preferred embodiment, the image processing service includes at least one of a scanner service, a print service, and a FAX service.

According to the fourth aspect of the present invention, a control method for an information processing apparatus which comprises a first communication unit and a second communication unit and communicates with an image processing apparatus, comprises:

an acquisition step of acquiring communication setting information for communicating with the image processing apparatus by the second communication unit via the first communication unit;

an establishing step of establishing communication by the second communication unit to execute an image processing service from the image processing apparatus, via the second communication unit in accordance with the communication setting information acquired in the acquisition step;

a detection step of detecting the establishment of communication in the establishing step; and a transmission step of transmitting an operation window display request for executing the image processing service to the image processing apparatus via the second communication unit when the establishment of communication is detected in the detection step.

According the fifth aspect of the present invention, a control method for an image processing apparatus which comprises a first communication unit and a second communication unit and communicates with an information processing apparatus, comprises:

a reception step of receiving, from the information processing apparatus via the second communication unit, an operation window display request for executing a service provided by the image processing apparatus;

a display step of displaying an operation window for executing the image processing service in accordance with the operation window display request received in the reception step; and an image processing step of executing image processing of input image data on the basis of settings set via the operation window displayed in the display step.

Further features of the present invention will become apparent from the following description of exemplary embodiments with reference to the attached drawings.

BRIEF DESCRIPTION OF THE DRAWINGS

FIG. 14 is a block diagram showing the functional arrangements of a handheld terminal and image processing apparatus in the conventional image processing system.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
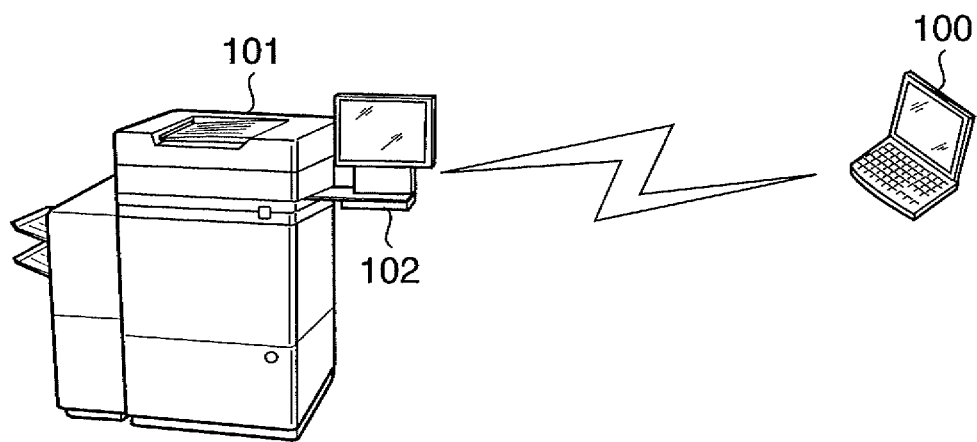
FIG. 1 is a perspective view showing the overall arrangement of an image processing system according to an embodiment of the present invention.

FIG. 1 is a perspective view showing the overall arrangement of an image processing system according to an embodiment of the present invention. This image processing system comprises a handheld terminal 100 which is an information processing apparatus and an image processing apparatus 101. These components can mutually communicate by wireless communication. The image processing apparatus 101 includes a device port 102 for short range wireless communication with the handheld terminal 100.

The hardware arrangement of the image processing apparatus 101 will be described next with reference to FIG. 2.

Figure 2:
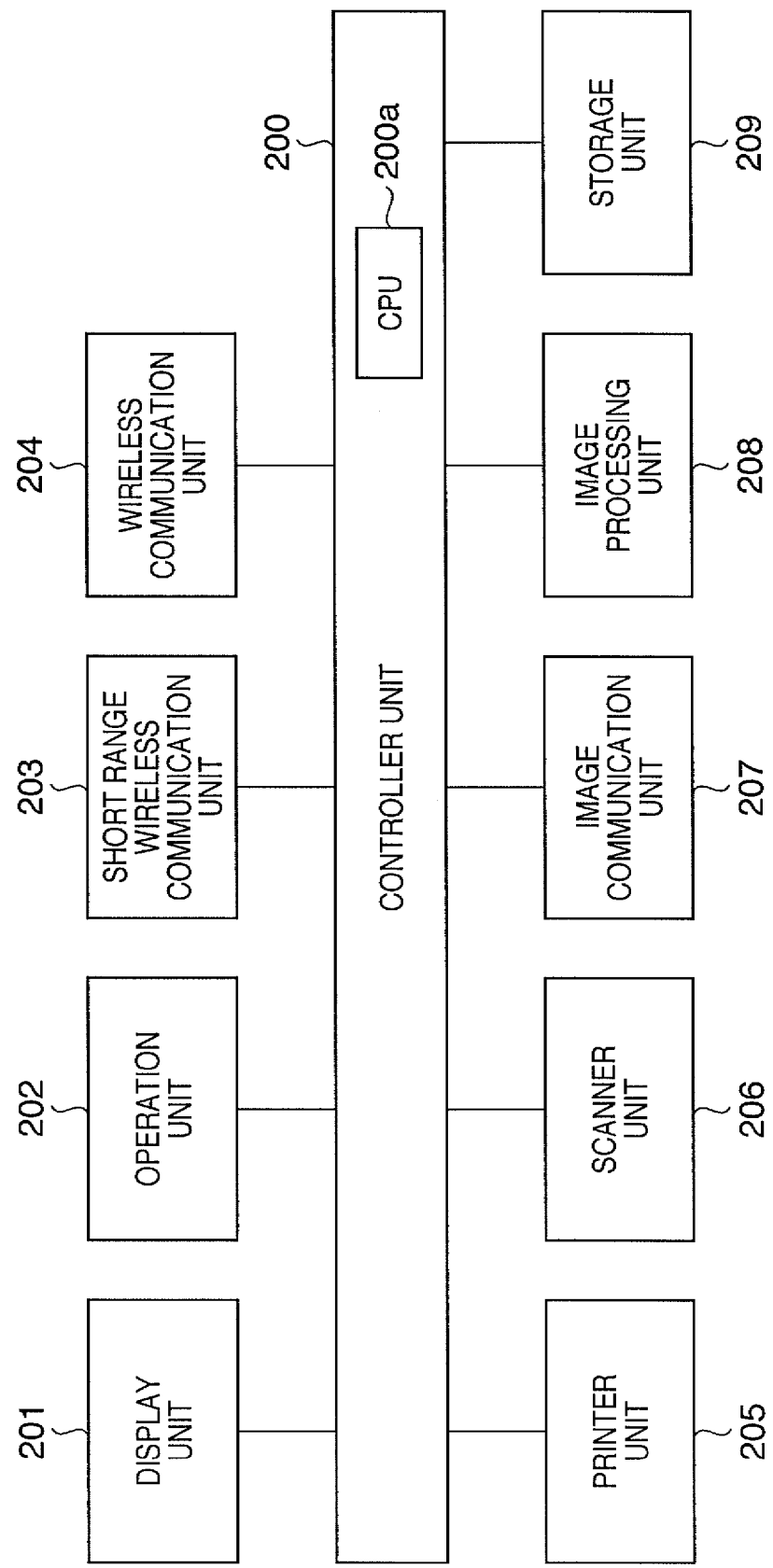
FIG. 2 is a block diagram showing the hardware arrangement of an image processing apparatus in the image processing system according to the embodiment of the present invention.

FIG. 2 is a block diagram showing the hardware arrangement of the image processing apparatus in the image processing system according to the embodiment of the present invention.

The image processing apparatus 101 is assumed to be a digital multifunction apparatus comprising a plurality of types of functions (services) such as a copy function, scanner function, printer function, and FAX function.

The image processing apparatus 101 includes a controller unit 200, display unit 201, operation unit 202, short range wireless communication unit 203, wireless communication unit 204, printer unit 205, scanner unit 206, image communication unit 207, image processing unit 208, and storage unit 209. The controller unit 200 incorporates a CPU (Central Processing Unit) 200a.

The display unit 201 displays various types of user interface windows for issuing instructions from the operation unit 202. The operation unit 202 allows the operator to perform desired operation by key operation.

An example of the arrangement of the display unit 201 and operation unit 202 will be described with reference to FIG. 3.

Figure 3:
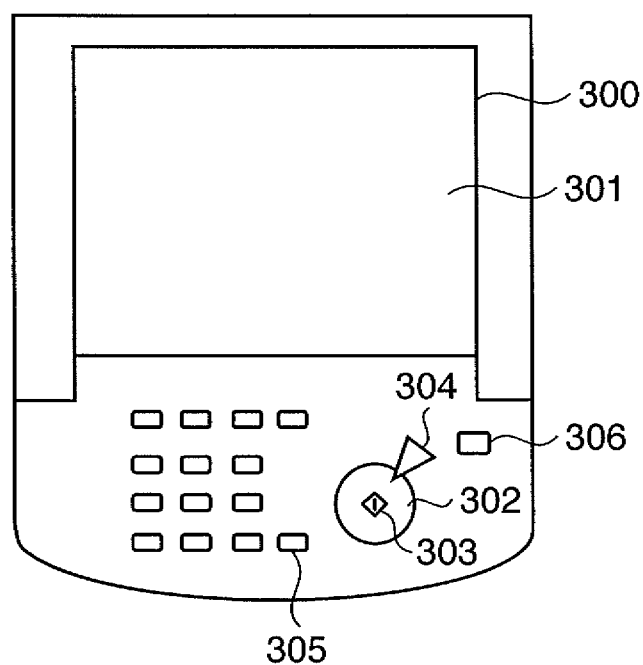
FIG. 3 is a view showing an example of the arrangement of a display unit and operation unit in the embodiment of the present invention.

FIG. 3 is a view showing an example of the arrangement of the display unit and operation unit in the embodiment of the present invention.

An LCD display unit 300 has a touch panel sheet 301 affixed to an LCD. The LCD display unit 300 displays a system operation window and soft keys. When the operator presses a displayed key, the LCD display unit 300 transmits the corresponding position information to the controller unit 200.

A start key 302 is a key to be used to issue a start instruction for processing when, for example, document image reading operation is to be started. The central portion of the start key 302 comprises, for example, a two-color LCD 303 of green and red. The color of light emitted by the two-color LCD 303 indicates whether the start key 302 is an operative state. A stop key 304 is a key to be used to stop operation under execution. An ID key 305 is a key to be used to input the user ID of a user (i.e., to perform user authentication). A reset key 306 is a key to be used to initialize settings from the display unit 201 and the operation unit 202. Recently, with an increase in the size of liquid crystal panels, a liquid crystal panel is often implemented by integrating the display unit 201 and the operation unit 202.

Refer back to FIG. 2.

The short range wireless communication unit 203 performs wireless communication within a very short range, and can be implemented by wireless communication based on the NFC (Near Field Communication) standard. NFC is a protocol for performing near field communication with another communication apparatus by electromagnetic induction using a carrier wave with a single frequency. As a carrier wave frequency, for example, 13.56 MHz in the ISM (Industrial Scientific Medical) band is used. As a data transfer rate, it is possible to select one of the following three different rates: 106 kbps, 212 kbps, and 424 kbps. When two NFC communication apparatuses are located within a predetermined communicable distance (e.g., 10 cm or 20 cm), they can communication with each other.

Figure 4:
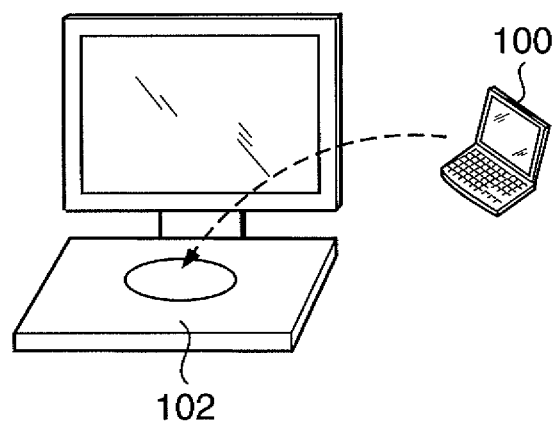
FIG. 4 is a perspective view showing how a handheld terminal is placed on the device port of the image processing apparatus.

In this embodiment, in particular, short range wireless communication is defined as wireless communication performed at a relatively short distance (within a predetermined communicable distance) as a communicable distance. In this embodiment, for example, as shown in FIG. 4, wireless communication based on the NFC standard can be performed by placing the handheld terminal 100 on the device port 102 of the image processing apparatus 101.

The wireless communication unit 204 performs wireless communication at a longer distance and a higher transmission rate than the short range wireless communication unit 203 does. This can be implemented by, for example, wireless communication based on wireless communication techniques, such as Bluetooth or wireless LAN (IEEE802.11a/b/g or the like). IEEE802.11a/b/g is a wireless communication scheme using radio waves in the 2.4 GHz band and 5 GHz band. When the 2.4 GHz band is to be used, the maximum transfer rate is 11 Mbps, and the communicable distance is about 100 m. When the 5 GHz band is to be used, the maximum transfer rate is 54 Mbps, and the communicable distance is about 10 m.

The printer unit 205 prints an electrical image signal as a visible image on a recording sheet, and comprises a laser beam printer or an inkjet printer.

The scanner unit 206 comprises an image sensor which optically reads a document image and converts it into an electrical image signal, a read driving unit, a read lighting control unit, and the like. When an overall document is scanned by the image sensor driven by the read driving unit of the scanner unit 206, the read lighting control unit performs lighting control on an LED inside the image sensor. At the same time, the photosensor inside the image sensor optically reads a document image and converts it into an electrical image signal.

The image communication unit 207 transmits/receives data to/from an external device. The image communication unit 207 connects to the Internet, a LAN, or a public telephone line to perform FAX communication, or connects to an external device (e.g., a PC (Personal Computer)) via a USB I/F.

The image processing unit 208 performs read image processing, communicated image processing, and recorded image processing. In read image processing, the image processing unit 208 performs shading correction for the image data received from the scanner unit 206, and performs gamma correction, binarization, halftone processing, color space conversion from RGB to CMYK or the like, and the like for the image data, thereby converting the image data into high-resolution image data.

In recorded image processing, the image processing unit 208 performs resolution conversion for image data in accordance with the recording resolution. The image processing unit 208 performs various types of image processing such as image magnification, smoothing, and density correction for image data to convert it into high-resolution image data, and outputs the data to the printer unit 205.

In communicated image processing, the image processing unit 208 executes resolution conversion and color space conversion for a read image in accordance with the communication performance, and executes resolution conversion or the like for the image received by the image communication unit 207 in accordance with the recording performance.

The storage unit 209 is a storage device such as a DDR-SDRAM or an HDD, and stores control programs, data, and the like used by the controller unit 200 to implement the function of the image processing apparatus 101 as well as temporarily storing image data.

The controller unit 200 is a unit which performs overall control on the image processing apparatus 101. The controller unit 200 is electrically connected to the respective constituent elements of the image processing apparatus 101 such as the printer unit 205 and the scanner unit 206, and performs control to implement advanced functions.

For example, in order to implement a scan function, the controller unit 200 controls the scanner unit 206 to read image data on a document. The controller unit 200 also controls the printer unit 205 to output image data to a recording sheet, thereby providing a copy function.

The controller unit 200 provides a scanner function of transmitting the image data read from the scanner unit 206 to a network via the image communication unit 207. The controller unit 200 provides a printer function of converting the code data received from the network via the image communication unit 207 into image data, and outputting the data to the printer unit 205. In order to implement such control, the controller unit 200 incorporates the CPU 200a.

The hardware arrangement of the handheld terminal 100 will be described next with reference to FIG. 5.

Figure 5:
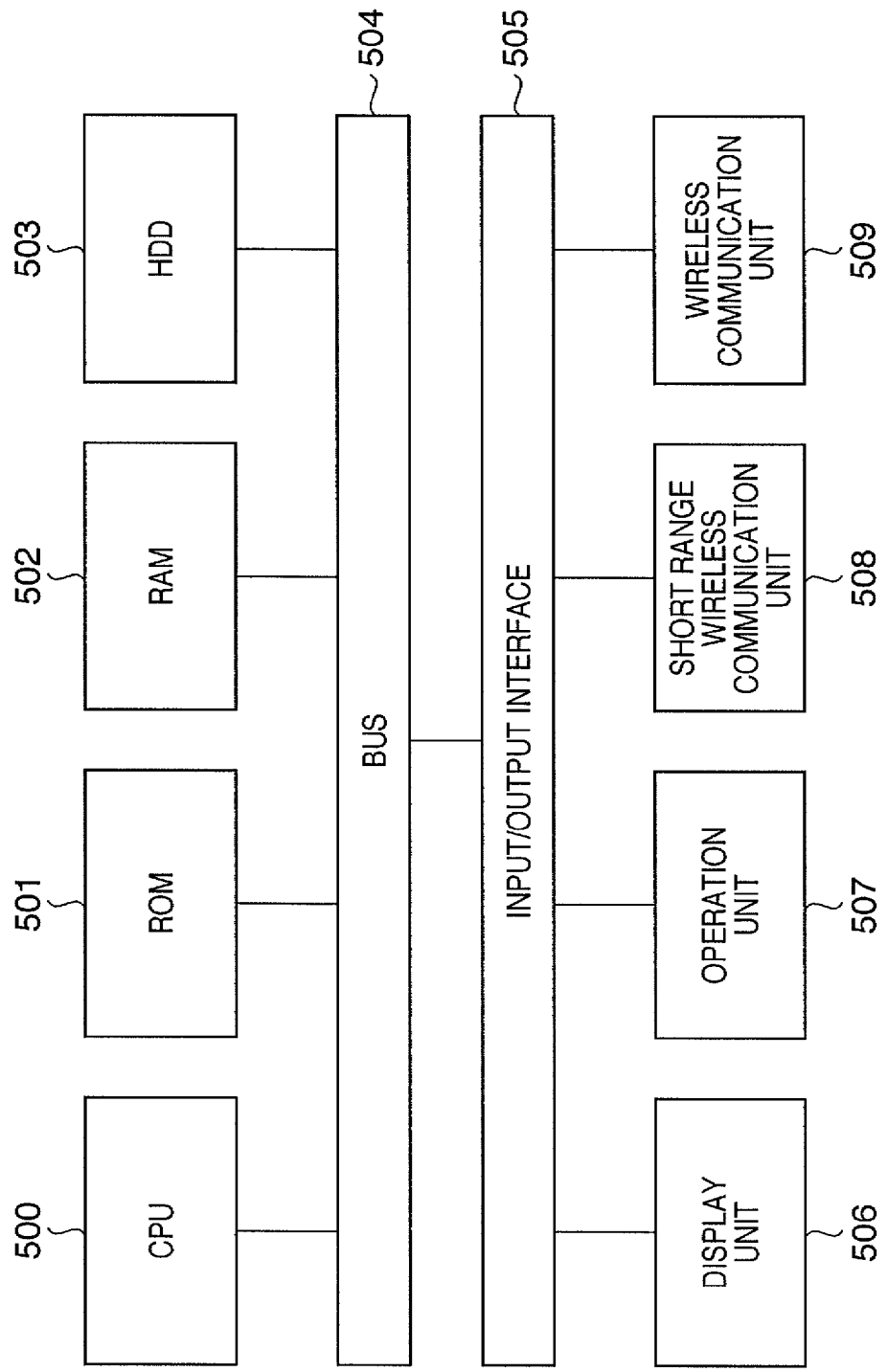
FIG. 5 is a block diagram showing the hardware arrangement of the handheld terminal in the image processing system according to the embodiment of the present invention.

FIG. 5 is a block diagram showing the hardware arrangement of the handheld terminal in the image processing system according to the embodiment of the present invention.

The handheld terminal 100 is assumed to be a mobile PC. Obviously, the handheld terminal can be assumed to be another portable device such as a cellular phone or a PDA.

The handheld terminal 100 includes a CPU 500, ROM 501, RAM 502, HDD (Hard Disk Drive) 503, bus 504, input/output interface 505, display unit 506, operation unit 507, short range wireless communication unit 508, and wireless communication unit 509.

The CPU 500 is an arithmetic device which controls the respective devices and performs calculation/processing for data. The input/output interface 505 is connected to the CPU 500 via the bus 504. The display unit (LCD (Liquid Crystal Display) or the like) 506 and the operation unit 507 (a mouse, keyboard, and the like) are connected to the input/output interface 505. Upon receiving a command input by operation by the operation unit 507, the CPU 500 loads a program stored in the ROM 501 or HDD 503 into the RAM 502 in accordance with the command, and executes the program. The CPU 500 then displays the processing result on the display unit 506, as needed.

The short range wireless communication unit 508 performs wireless communication with the short range wireless communication unit 203 of the image processing apparatus 101 at a very short distance. This can be implemented by, for example, wireless communication based on the NFC (Near Field Communication) standard. In this embodiment, as shown in FIG. 4, wireless communication based on NFC can be performed by placing the handheld terminal 100 on the device port 102 of the image processing apparatus 101.

The wireless communication unit 509 performs wireless communication with the wireless communication unit 204 of the image processing apparatus 101. This can be implemented by wireless communication based on wireless communication techniques, such as Bluetooth or wireless LAN (IEEE802.11a/b/g or the like).

The functional arrangements of the handheld terminal 100 and image processing apparatus 101 in the image processing system will be described next with reference to FIG. 6.

Figure 6:
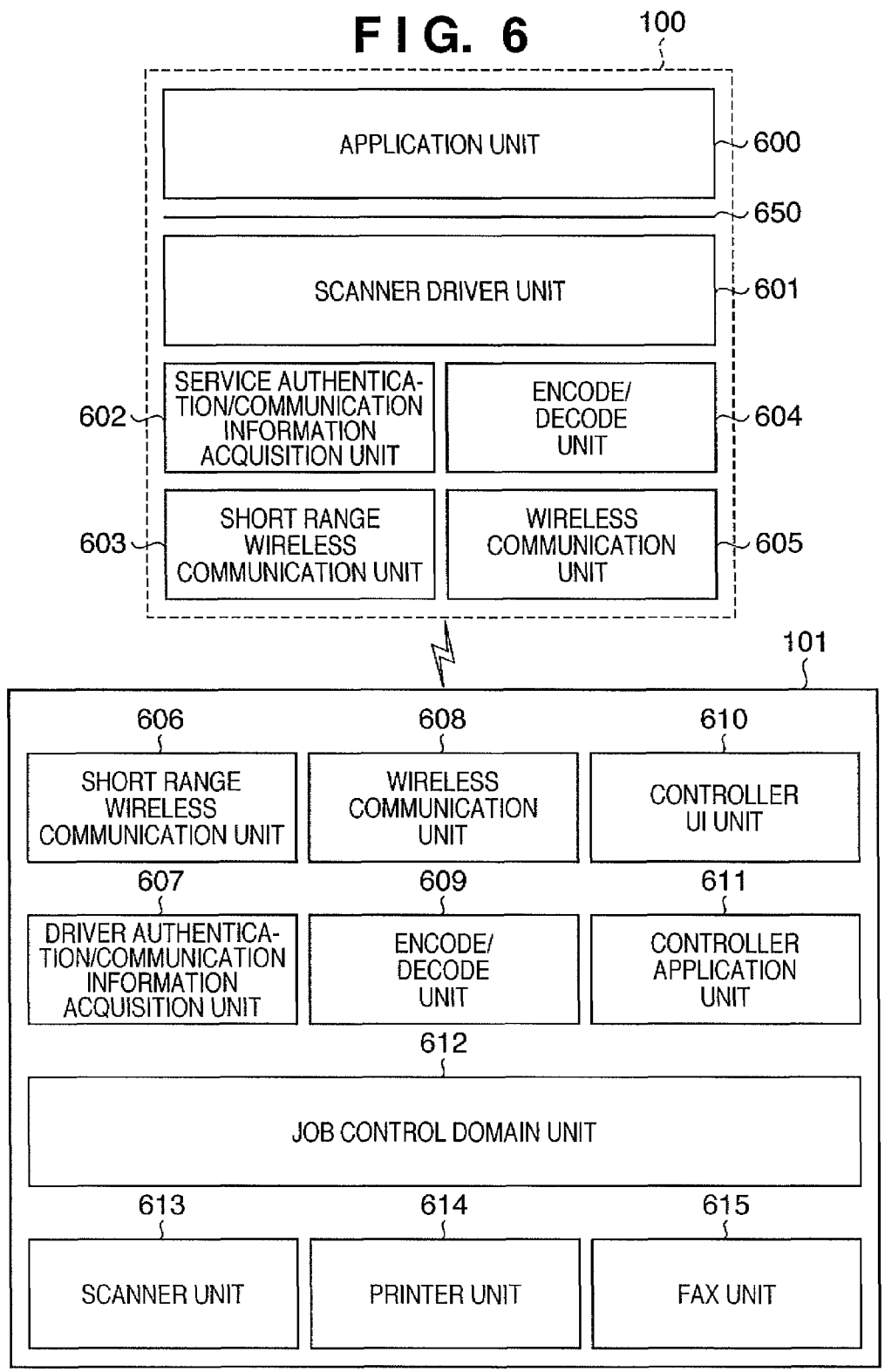
FIG. 6 is a block diagram showing the functional arrangements of the handheld terminal and image processing apparatus in the image processing system according to the embodiment of the present invention.

FIG. 6 is a block diagram showing the functional arrangements of the handheld terminal and image processing apparatus in the image processing system according to the embodiment of the present invention.

The handheld terminal 100 includes an application unit 600, scanner driver unit 601, service authentication/communication information acquisition unit 602, short range wireless communication unit 603, encode/decode unit 604, and wireless communication unit 605.

The image processing apparatus 101 includes a short range wireless communication unit 606, driver authentication/communication information acquisition unit 607, wireless communication unit 608, and encode/decode unit 609. The image processing apparatus 101 includes a controller UI unit 610, controller application unit 611, job control domain unit 612, scanner unit 613, printer unit 614, and FAX unit 615.

When the operator places the handheld terminal 100 on the device port 102 of the image processing apparatus 101, the short range wireless communication unit 603 of the handheld terminal 100 starts wireless communication based on the NFC standard with the short range wireless communication unit 606 of the image processing apparatus 101.

The service authentication/communication information acquisition unit 602 acquires scan service information of the image processing apparatus 101 via the short range wireless communication unit 603, and performs authentication to determine whether the information is a communicable scan service. The service authentication/communication information acquisition unit 602 also acquires communication information required for communication with the wireless communication unit 608 of the image processing apparatus 101 via the short range wireless communication unit 603.

The driver authentication/communication information acquisition unit 607 acquires the scanner driver information of the handheld terminal 100 via the short range wireless communication unit 606, and performs authentication to determine whether the information is a communicable scanner driver. The driver authentication/communication information acquisition unit 607 also acquires communication information required for communication with the wireless communication unit 605 of the handheld terminal 100 via the short range wireless communication unit 606.

The application unit 600 is an application using image data obtained by scanning. Upon activating the scanner driver unit 601 via the I/F 650 (TWAIN, WIA, or the like) in accordance with operation by the operator, the application unit 600 supplies a scan request to the scanner driver unit 601.

The scanner driver unit 601 receives a scan request from the application unit 600, and acquires an authentication result and communication information from the service authentication/communication information acquisition unit 602. The scanner driver unit 601 supplies the communication information and scan job information accompanied with a UI display request (operation window display request) as a job attribute to the encode/decode unit 604 in accordance with the authentication result. The encode/decode unit 604 generates packet data in accordance with the communication information and the scan job information, and transmits the data to the image processing apparatus 101 via the wireless communication unit 605.

The handheld terminal 100 and the image processing apparatus 101 perform data communication by wireless communication via the wireless communication unit 605 of the handheld terminal 100 and the wireless communication unit 608 of the image processing apparatus 101.

The encode/decode unit 609 generates scan job information by analyzing the packet data received by the wireless communication unit 608, and supplies the scan job information to the job control domain unit 612.

The job control domain unit 612 controls processing for a plurality of jobs such as a scan job, copy job, and print job. Upon receiving scan job information accompanied with a UI display request, the job control domain unit 612 acquires an authentication result and communication information from the driver authentication/communication information acquisition unit 607. The job control domain unit 612 then interrupts the processing for the scan job, and supplies the scan job information and an interaction mode shift notification to the controller application unit 611.

The controller application unit 611 receives the scan job information and the interaction mode shift notification, and supplies scan setting information conforming to the scan job information and the scan mode shift notification to the controller UI unit 610. The controller UI unit 610 receives the scan mode shift notification, generates a scan setting window conforming to the supplied scan setting information, and displays it on the display unit 201.

The operator performs scan setting (a color mode, resolution, and the like) on the scan setting window displayed by the controller UI unit 610, and then performs operation for the execution of scanning. The controller UI unit 610 supplies the scan setting information to the controller application unit 611, together with a scan request, in accordance with the operation for the execution of scanning by the operator.

The controller application unit 611 generates scan job information in accordance with the scan setting information, and supplies the information to the job control domain unit 612. The job control domain unit 612 resumes the interrupted processing for the scan job, and operates the scanner unit 613 on the basis of the scan job information supplied from the controller application unit 611.

The scanner unit 613 reads a document, and stores the obtained image data in the storage device. The job control domain unit 612 supplies notification information indicating the generation and storage of image data to the encode/decode unit 609. The encode/decode unit 609 generates packet data conforming to the notification information and transmits the data to the handheld terminal 100 via the wireless communication unit 608.

Upon receiving the notification information, the scanner driver unit 601 of the handheld terminal 100 transmits an image acquisition command to the image processing apparatus 101, and receives image data from the image processing apparatus 101 as a response to the command. The scanner driver unit 601 supplies the image data to the application unit 600 via an I/F 650.

Note that the printer unit 614 is controlled by the job control domain unit 612 to print image data. The FAX unit 615 is controlled by the job control domain unit 612 to perform FAX transmission/reception of image data.

A processing flowchart associated with scan icon activation display on the handheld terminal 100 will be described next with reference to FIG. 7.

Figure 7:
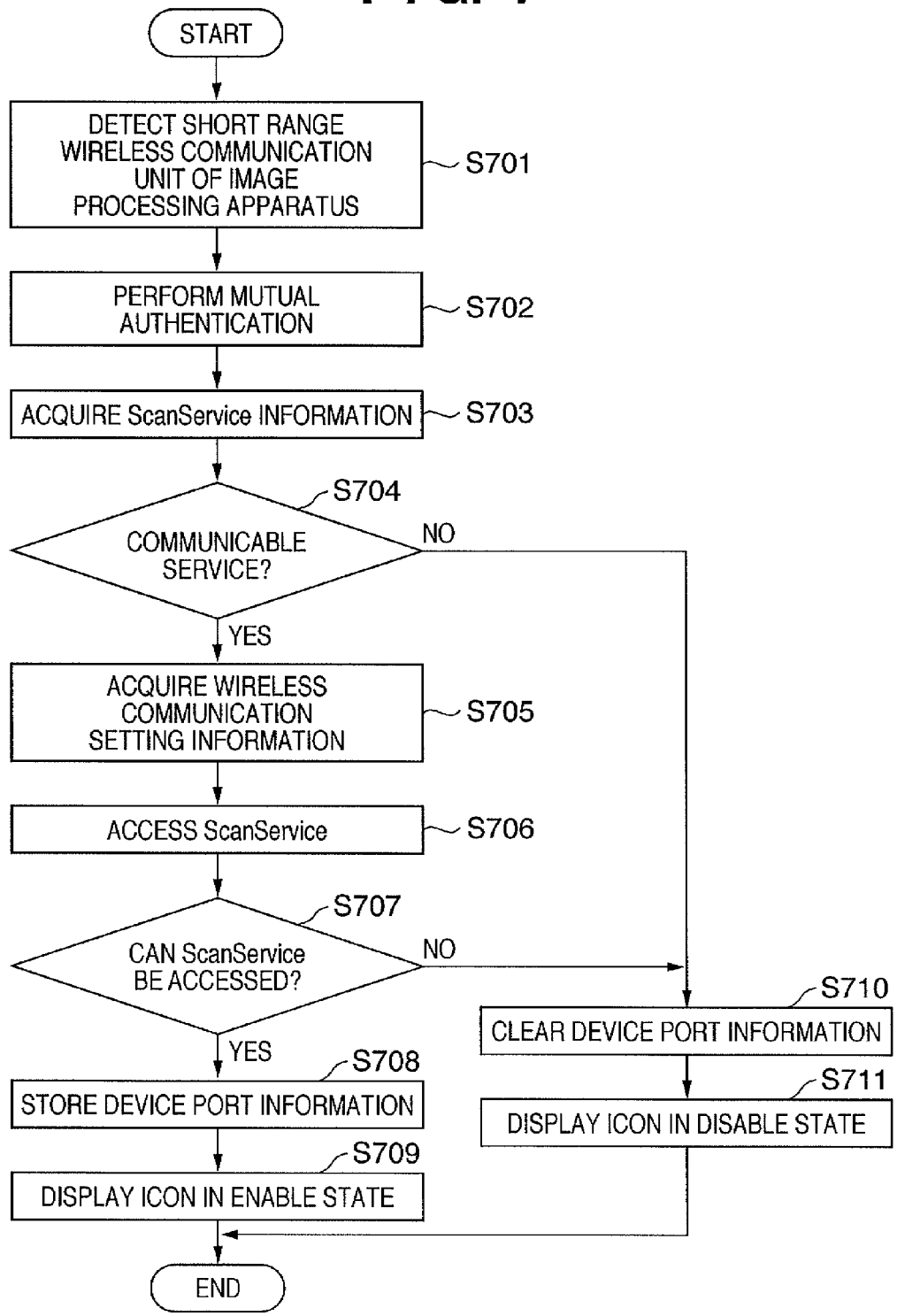
FIG. 7 is a flowchart showing scan icon activation display processing in the handheld terminal according to the embodiment of the present invention.

FIG. 7 is a flowchart showing scan icon activation display processing in the handheld terminal according to the embodiment of the present invention.

Note that this processing is implemented when the CPU 500 of the handheld terminal 100 loads a program stored in the ROM 501 or the HDD 503 into the RAM 502 and implements and executes the respective functions of the handheld terminal 100 shown in FIG. 6.

This processing starts when the handheld terminal 100 is located at a distance that allows NFC communication as the operator places the terminal on the device port 102 of the image processing apparatus 101.

In this state, the short range wireless communication unit 603 detects short range wireless communication connection (presence) with the short range wireless communication unit 203 (e.g., an NFC chip) of the image processing apparatus 101 (step S701). The service authentication/communication information acquisition unit 602 then performs mutual authentication to determine whether the detected device is a short range wireless communication compatible device for the short range wireless communication unit 508 (step S702). In this embodiment, this unit performs mutual authentication to determine whether the device is an NFC compatible device.

The service authentication/communication information acquisition unit 602 then acquires scan service (ScanService) information of the image processing apparatus 101 via the short range wireless communication unit 508 (step S703). The scanner driver unit 601 determines whether the acquired scan service information is the scan service of the image processing apparatus 101 which can be communicated (step S704). Note that scan service information is, for example, authentication information, version information, or capability information.

If this information is a communicable scan service (YES in step S704), the service authentication/communication information acquisition unit 602 acquires communication setting information necessary for wireless communication with the image processing apparatus 101 via the short range wireless communication unit 603 (step S705). The scanner driver unit 601 transmits a command for the scan service of the image processing apparatus 101 via the wireless communication unit 509 (step S706). The scanner driver unit 601 then determines on the basis of a response to the command whether it can access the scan service of the image processing apparatus 101 (step S707).

If it is possible to access the scan service (YES in step S707), the scanner driver unit 601 stores device port information for accessing the scan service in the RAM 502 (step S708). The scanner driver unit 601 displays, on the display unit 506 of the handheld terminal 100, an icon in an enable state which indicates that the scan service of the image processing apparatus 101 can be accessed, and terminates the processing (step S709). Note that the device port information comprises the scan service information acquired in step S703 and the communication setting information acquired in step S705.

If the information is not a communicable scan service (NO in step S704) or the scan service cannot be accessed (NO in step S707), the scanner driver unit 601 clears the device port information (step S710). That is, in this case, the scanner driver unit 601 inhibits the establishment of communication with the image processing apparatus via the wireless communication unit 509.

The scanner driver unit 601 then displays, on the display unit 506 of the handheld terminal 100, an icon in a disable state which indicates that the scan service of the image processing apparatus 101 cannot be accessed, and terminates the processing (step S711).

A processing flowchart associated with scan icon deactivation display on the handheld terminal 100 will be described next with reference to FIG. 8.

Figure 8:
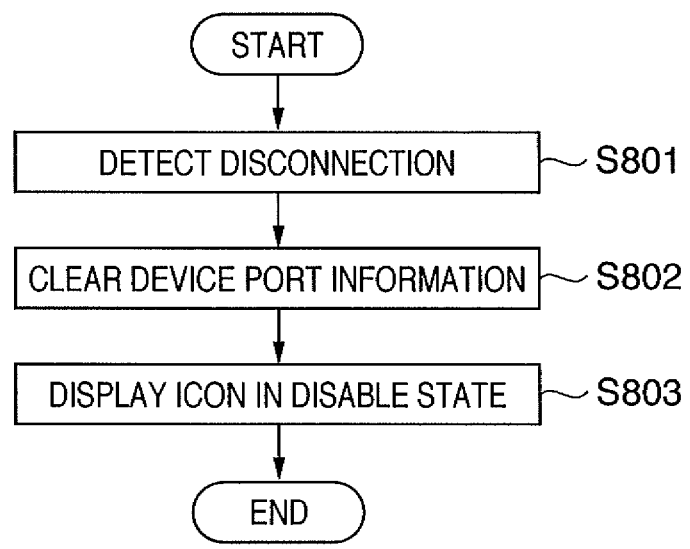
FIG. 8 is a flowchart showing scan icon deactivation display processing in the handheld terminal according to the embodiment of the present invention.

FIG. 8 is a flowchart showing scan icon deactivation display processing in the handheld terminal according to the embodiment of the present invention.

Note that this processing is implemented when the CPU 500 of the handheld terminal 100 loads a program stored in the ROM 501 or the HDD 503 into the RAM 502 and implements and executes the respective functions of the handheld terminal 100 shown in FIG. 6.

This processing starts when the handheld terminal 100 is located at a distance that disables NFC communication as the operator detaches the handheld terminal 100 from the device port 102 of the image processing apparatus 101.

In this state, the short range wireless communication unit 603 detects short range wireless communication disconnection from the short range wireless communication unit 203 of the image processing apparatus 101 (step S801). The scanner driver unit 601 clears device port information stored in the RAM 502 (step S802). The scanner driver unit 601 displays, on the display unit 506 of the handheld terminal 100, an icon in a disable state which indicates that short range wireless communication cannot be performed, and terminates the processing (step S803).

A processing flowchart associated with driver authentication in the image processing apparatus 101 will be described next with reference to FIG. 9.

Figure 9:
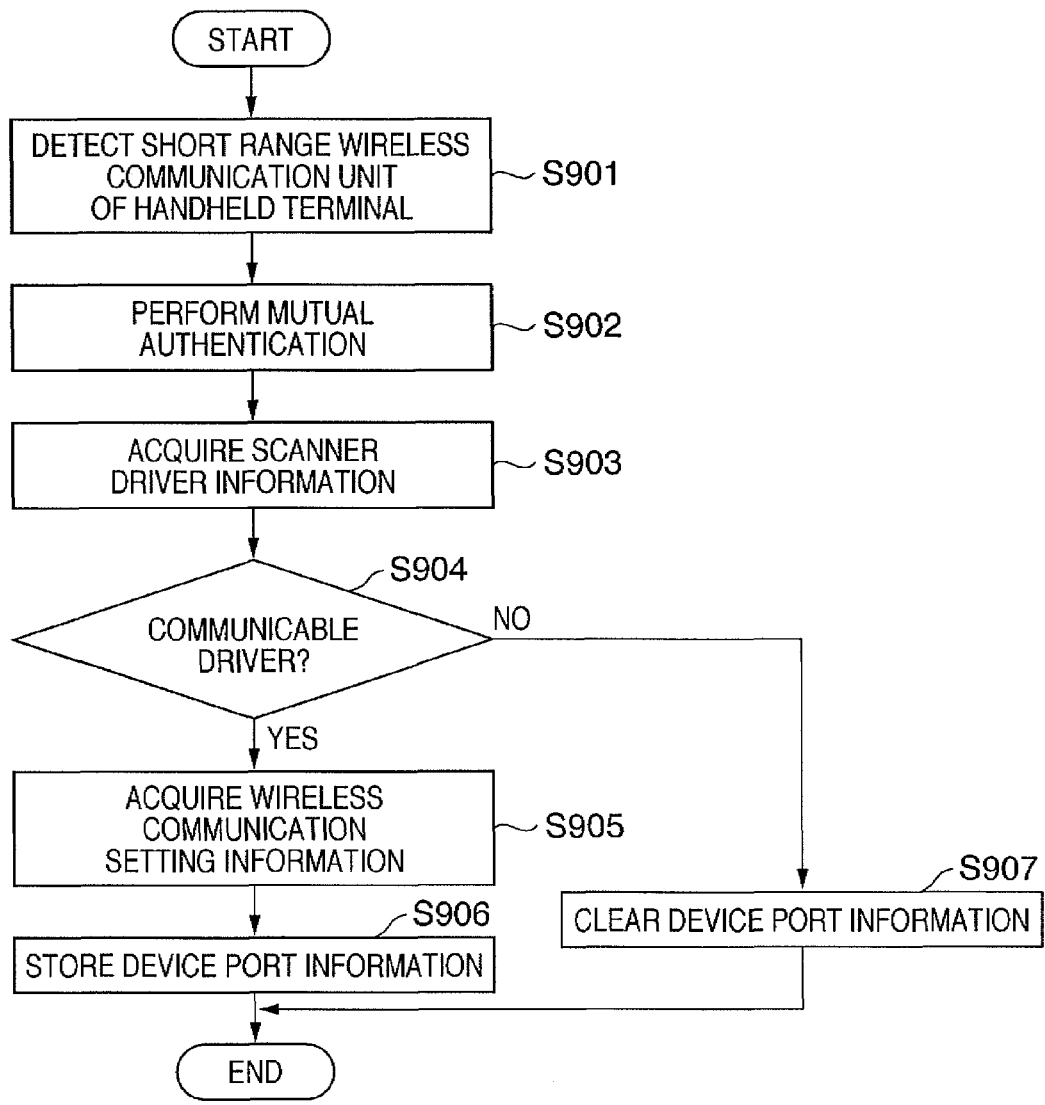
FIG. 9 is a flowchart showing driver authentication processing in the image processing apparatus according to the embodiment of the present invention.

FIG. 9 is a flowchart showing driver authentication processing in the image processing apparatus according to the embodiment of the present invention.

Note that this processing is implemented when the CPU 200a of the image processing apparatus 101 loads a program stored in the storage unit 209 into the RAM and implements and executes the respective functions of the image processing apparatus 101 shown in FIG. 6.

This processing starts when the handheld terminal 100 is located at a distance that allows NFC communication as the operator places the terminal on the device port 102 of the image processing apparatus 101.

In this state, the short range wireless communication unit 606 detects short range wireless communication connection (presence) with the short range wireless communication unit 508 of the handheld terminal 100 (step S901). The service authentication/communication information acquisition unit 607 then performs mutual authentication to determine whether the detected device is a short range wireless communication compatible device for the short range wireless communication unit 203 (step S902). In this embodiment, this unit performs mutual authentication to determine whether the device is an NFC compatible device.

The service authentication/communication information acquisition unit 607 then acquires scanner driver information of the handheld terminal 100 via the short range wireless communication unit 203 (step S903). The job control domain unit 612 determines whether the acquired scanner driver information indicates the scanner driver of the handheld terminal 100 which can be communicated (step S904). Note that the scanner driver information is, for example, authentication information or version information.

If this information is a communicable scanner driver (YES in step S904), the driver authentication/communication information acquisition unit 607 acquires, via the short range wireless communication unit 203, communication setting information necessary for wireless communication with the handheld terminal 100 (step S905). The job control domain unit 612 stores the device port information in the storage unit 209 and terminates the processing (step S906). Note that the device port information comprises the scanner driver information acquired in step S903 and the communication setting information acquired in step S905.

If the information does not indicate a communicable scanner driver (NO in step S904), the job control domain unit 612 clears the device port information and terminates the processing (step S907).

A processing flowchart associated with driver authentication clear processing in the image processing apparatus 101 will be described next with reference to FIG. 10.

Figure 10:
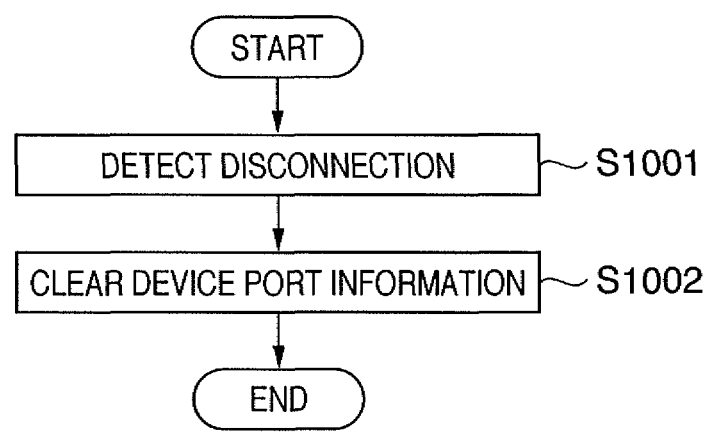
FIG. 10 is a flowchart showing driver authentication processing in the image processing apparatus according to the embodiment of the present invention.

FIG. 10 is a flowchart showing driver authentication clear processing in the image processing apparatus according to the embodiment of the present invention.

Note that this processing is implemented when the CPU 200a of the image processing apparatus 101 loads a program stored in the storage unit 209 into the RAM and implements and executes the respective functions of the image processing apparatus 101 shown in FIG. 6.

This processing starts when the handheld terminal 100 is located at a distance that disables NFC communication as the operator detaches the terminal from the device port 102 of the image processing apparatus 101.

In this state, the short range wireless communication unit 606 detects short range wireless communication disconnection from the short range wireless communication unit 508 of the handheld terminal 100 (step S101). The job control domain unit 612 clears the device port information stored in the storage unit 209, and terminates the processing (step S1002).

A processing flowchart associated with scan processing in the handheld terminal 100 will be described next with reference to FIG. 11.

Figure 11:
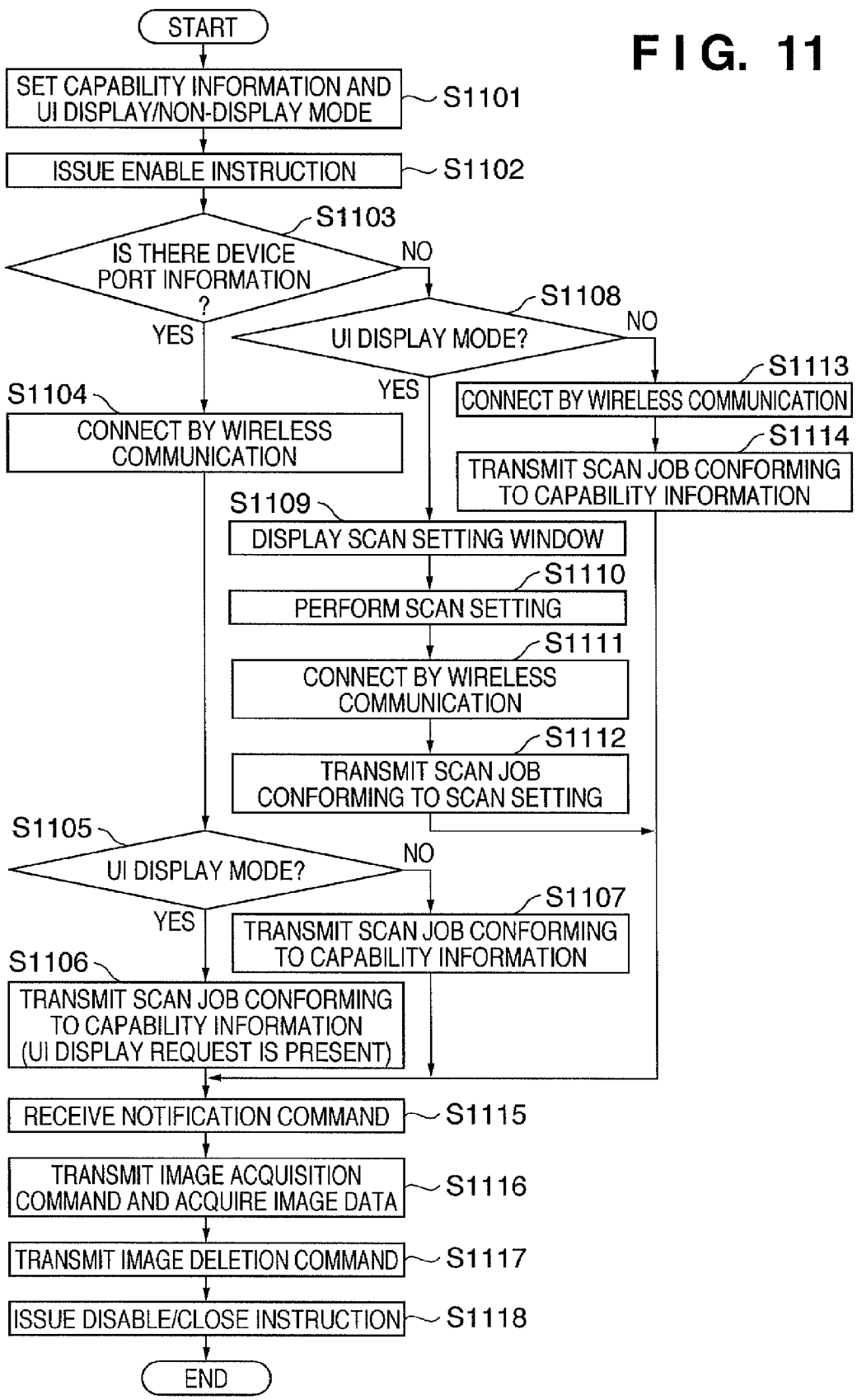
FIG. 11 is a flowchart showing scan processing in the handheld terminal according to the embodiment of the present invention.

FIG. 11 is a flowchart showing scan processing in the handheld terminal according to this embodiment of the present invention.

Note that this processing is implemented when the CPU 500 of the handheld terminal 100 loads a program stored in the ROM 501 or the HDD 503 into the RAM 502 and implements and executes the respective functions of the handheld terminal 100 shown in FIG. 6.

The application unit 600 starts this processing by activating the scanner driver unit 601 via the I/F 650 when, for example, the operator operates to issue a scan instruction to an application operating on the handheld terminal 100.

The application unit 600 sets, for the scanner driver unit 601, capability information and a UI display/non-display mode of determining whether to display a UI (User Interface) (step S1101). With this setting, the application unit 600 issues an enable instruction for the execution of scan processing to the scanner driver unit 601 (step S1102). Note that capability information includes a color mode, resolution, and the like. The application unit 600 sets this information as needed, but may not set it.

The scanner driver unit 601 determines whether device portion information is stored in the RAM 502 (step S1103). If device portion information is stored (YES in step S1103), the scanner driver unit 601 performs wireless communication connection with the scan service of the image processing apparatus 101 via the wireless communication unit 605 (step S1104).

The scanner driver unit 601 determines whether the UI display mode is set (step S1105). If the UI display mode is set (YES in step S1105), the scanner driver unit 601 transmits, via the wireless communication unit 605, scan job information conforming to capability information containing a UI display request to the image processing apparatus 101 (step S1106). If the UI non-display mode is set (NO in step S1105), the scanner driver unit 601 transmits, via the wireless communication unit 605, scan job information conforming to capability information containing no UI display request to the image processing apparatus 101 (step S1107).

If no device port information is stored (NO in step S1103), the scanner driver unit 601 determines whether the UI display mode is set (step S1108). If the UI display mode is set (YES in step S1108), the scanner driver unit 601 displays a scan setting window conforming to capability information on the display unit 506 (step S1109). The scanner driver unit 601 performs scan setting in accordance with operation by the operator on the scan setting window, and issues a scan execution instruction (step S1110).

The scanner driver unit 601 wirelessly connects to the scan service of the specific (designated) image processing apparatus 101 via the wireless communication unit 605 in accordance with pre-stored communication setting information (step S111). The scanner driver unit 601 transmits scan job information conforming to the scan setting to the image processing apparatus 101 via the wireless communication unit 605 (step S1112). The communication setting information in this case is set when, for example, the operator selects an image processing apparatus which can perform wireless communication from a list window of image processing apparatuses.

If the UI non-display mode is set (NO in step S1108), the scanner driver unit 601 wirelessly connects to the scan service of the image processing apparatus 101 via the wireless communication unit 605 in accordance with pre-stored communication setting information (step S1113). The scanner driver unit 601 transmits, via the wireless communication unit 605, scan job information conforming to capability information to the image processing apparatus 101 (step S1114).

The scanner driver unit 601 receives, via the wireless communication unit 605, a notification command notifying the generation and storage of the image data obtained by scanning from the scan service of the image processing apparatus 101 (step S1115). The scanner driver unit 601 then transmits, via the wireless communication unit 605, an image acquisition command for acquiring the image data obtained by scanning to the image processing apparatus 101. In addition, the scanner driver unit 601 receives the image data from the image processing apparatus 101 via the wireless communication unit 605 in accordance with a response command, and transfers the image data to the application unit 600 via the I/F 650 (step S1116). The application unit 600 transmits, via the wireless communication unit 605, an image deletion command for deleting the image data to the image processing apparatus 101 (step S1117).

The application unit 600 issues, via the I/F 650, a disable/close instruction for terminating the scan processing to the scanner driver unit 601, and terminates the processing (step S1118).

A processing flowchart associated with scan processing in the image processing apparatus 101 will be described next with reference to FIG. 12.

Figure 12:
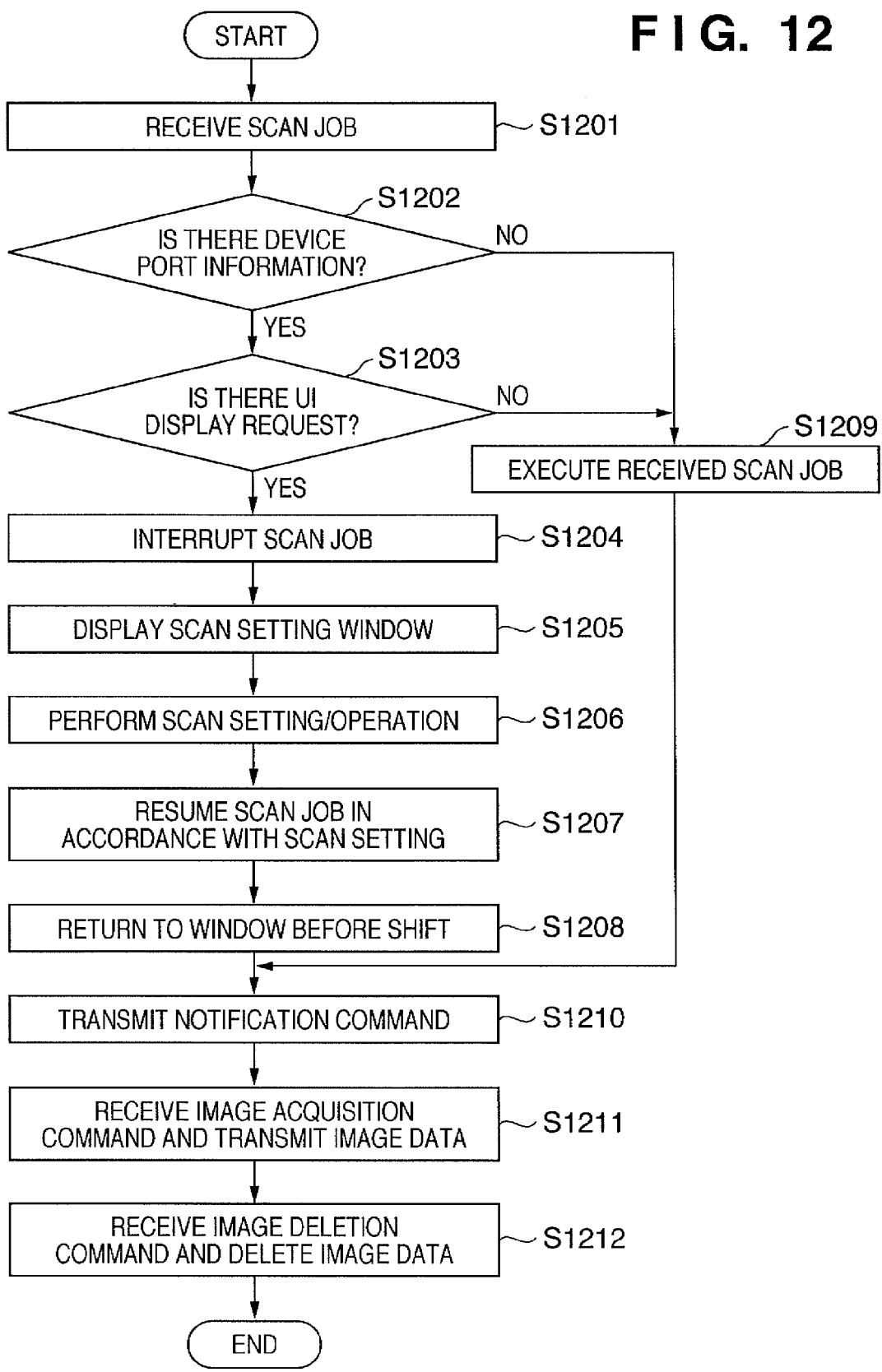
FIG. 12 is a flowchart showing scan processing in the image processing apparatus according to the embodiment of the present invention.
Figure 13:
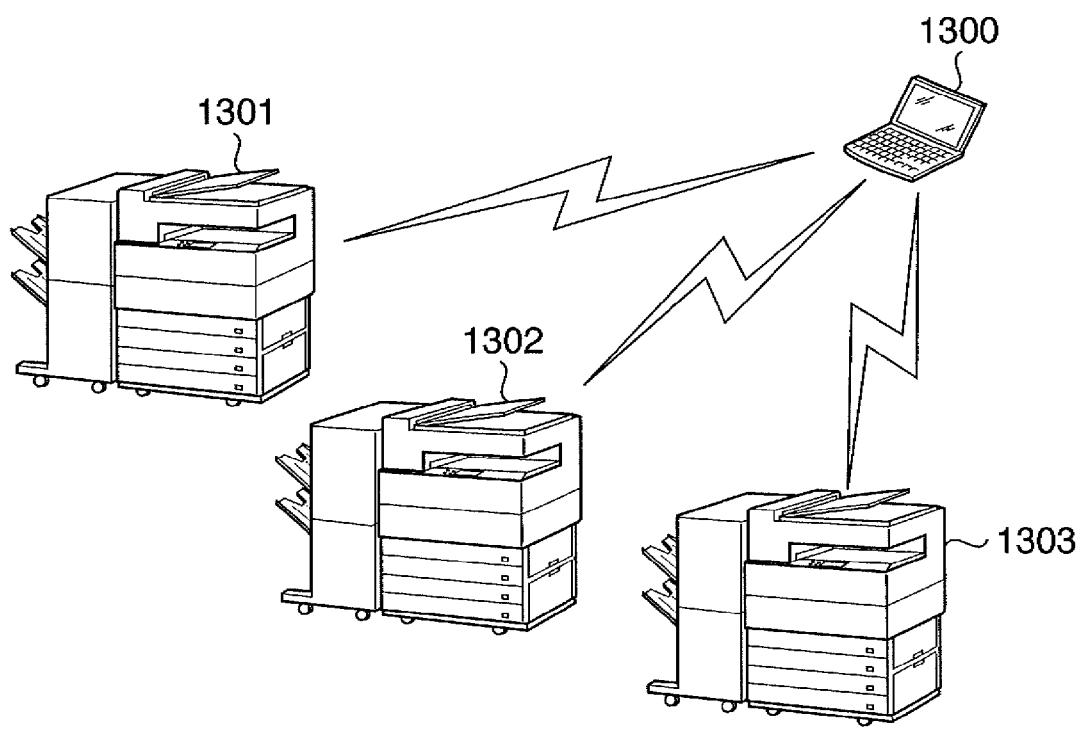
FIG. 13 is a view showing the overall arrangement of a conventional image processing system.

FIG. 12 is a flowchart showing scan processing in the image processing apparatus according to the embodiment of the present invention.

Note that this processing is implemented when the CPU 200*a* of the image processing apparatus 101 loads a program stored in the storage unit 209 into the RAM and implements and executes the respective functions of the image processing apparatus 101 shown in FIG. 6.

This processing starts when a scan service receives scan job information from the scanner driver of the handheld terminal 100 by wireless communication in a state in which a job can be accepted.

The wireless communication unit 608 receives scan job information from the handheld terminal 100 (step S1201). The job control domain unit 612 then determines whether the scan job information contains device port information (step S1202). If the scan job information contains device port information (YES in step S1202), the job control domain unit 612 determines whether the received scan job information contains a UI display request (step S1203). If the information contains a UI display request (YES in step S1203), the job control domain unit 612 interrupts the processing of the scan job, and shifts to the interaction mode (step S1204). The job control domain unit 612 causes the controller UI unit 610 to display a scan setting window as an operation window on the display unit 201 (step S1205).

The controller UI unit 610 performs scan setting on the basis of operation on the scan setting window and an operation key by the operator (step S1206). The job control domain unit 612 resumes the interrupted processing of the scan job by the scan service, executes the scan processing in accordance with the scan setting performed by the operator, and stores the image data obtained by scanning in the storage unit 209 (step S1207). The job control domain unit 612 returns the operation window to the window before the shift to the interaction mode (step S1208).

If the scan job information contains no device port information (NO in step S1202), the job control domain unit 612 causes the scanner unit 613 to execute scan processing in accordance with the received scan job information. If the scan job information contains no UI display request (NO in step S1202), the job control domain unit 612 causes the scanner unit 613 to execute scan processing in accordance with the received scan job information. The job control domain unit 612 then stores the scanned image data in the storage unit 209 (step S1209).

The job control domain unit 612 transmits, via the wireless communication unit 608, a notification command notifying the generation and storage of the image data obtained by scanning in the scan service to the scanner driver unit 601 of the handheld terminal 100 (step S1210). The job control domain unit 612 receives an image acquisition command from the scanner driver unit 601 of the handheld terminal 100 via the wireless communication unit 608, and transmits the image data as a response command (step S1211). The job control domain unit 612 then receives an image deletion command from the scanner driver unit 601 of the handheld terminal 100 via the wireless communication unit 608. The job control domain unit 612 deletes the image data stored in the storage unit 209 and terminates the processing (step S1212).

As has been described above, according to this embodiment, only placing a handheld terminal within the range in which it can perform short range wireless communication with an image processing apparatus makes it possible to start communication with the image processing apparatus and automatically execute various types of processing such as setting for necessary processing. In addition, it is possible to perform setting and operation for scan processing on an operation window and an operation key on the image processing apparatus side instead of the handheld terminal side. This allows the handheld terminal to capture the image obtained by scanning by the image processing apparatus with simple operation.

Note that this embodiment has exemplified the method of allowing the operator to operate a setting window on the image processing apparatus by activating the scanner driver with an application as a method of capturing the image obtained by scanning in an arbitrary application on the handheld terminal. However, the present invention is not limited to this.

For example, it is possible to execute scan processing by only pressing the operation key on the image processing apparatus after placing the handheld terminal on the device port of the image processing apparatus and store image data in a predetermined folder in the handheld terminal with the same arrangement as that described above.

In this case, the scan application which transmits scan job information by using the scanner driver unit is resident in the handheld terminal. In this state, when the handheld terminal is placed on the device port of the image processing apparatus, the scan application transmits scan job information conforming to predetermined scan setting to the image processing apparatus by wireless communication.

Upon receiving a scan job from the handheld terminal on the device port, the image processing apparatus interrupts the scan job, shifts the operation window to the scan setting window, and activates scan operation by the operation key. If there is no need to change the scan setting, the operator only presses the operation key for the execution of scanning. With this operation, the processing of the scan job is resumed and executed. In addition, the scan application of the handheld terminal receives image data from the image processing apparatus by wireless communication, and holds the image data in a predetermined folder.

The above embodiment has exemplified the arrangement of implementing efficient linkage of the scanner function of the image processing between the handheld terminal and the image processing apparatus. However, the present invention is not limited to this. For example, the present invention can be applied to a printer function in another function (service) of the image processing apparatus. In this case, it is also possible to output image data stored in the handheld terminal from the printer unit of the image processing apparatus.

In addition, the present invention can be applied to the FAX function. In this case, for example, it is possible to FAX-output image data in the handheld terminal from the image communication unit of the image processing apparatus.

As described above, the present invention can implement efficient linkage between services (image processing services) provided by various types of devices (a printer, scanner, FAX machine, and the like) which the image processing apparatus has and the corresponding device drivers of an information processing apparatus (handheld terminal).

The above embodiment has exemplified wireless communication as a communication form. However, wired communication may be used. For example, it suffices to perform wired communication based on the 10BaseT standard as short range wireless communication and perform wired communication based on 1GBaseT standard as wireless communication.

In any case, the present invention allows the use of an arbitrary combination of wireless communication and wired communication as long as efficient mutual communication can be implemented by using communication standards with proper communication characteristics in accordance with applications and purposes. For example, a communication standard for relatively short range communication (or relatively low communication rate) is used for communication of a relatively small communication amount such as negotiation associated with the establishment of connection between apparatuses. On the other hand, a communication standard for relatively long range communication (or relatively high communication rate) is used for communication of a relatively large communication amount such as image data transfer.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023514, filed Feb. 1, 2007, which is hereby incorporated by reference herein in its entirety.

What is claimed is:

1. An information processing apparatus configured to communicate with an image processing apparatus, the information processing apparatus comprising:

a first communication unit configured to start wireless communication by contacting the information processing apparatus to a port of the image processing apparatus;

a second communication unit configured to start wireless communication without contacting the information processing apparatus to a port of the image processing apparatus, wherein a transmission rate of the second communication unit is higher than a transmission rate of the first communication unit;

an acquisition unit configured to acquire, via wireless communication by the first communication unit, information from the image processing apparatus to determine whether a scan service provided by the image processing apparatus comprising a scanner unit can be used; and a display unit configured to display an icon indicating that the scan service can be accessed when it is determined that the scan service can be used;

wherein the acquisition unit acquires, after a scan process is executed by the image processing apparatus in response to an operator issuing a scan instruction, scan data of a document scanned by the scan process via wireless communication by the second communication unit, and the image processing apparatus deletes the scan data.

2. The apparatus according to claim 1, wherein the display unit switches and displays from the displayed icon indicating that the scan service can be communicated to the icon indicating that the scan service cannot be communicated according to disconnection of wireless communication by the first communication unit.

3. The apparatus according to claim 1, wherein the information processing apparatus is configured to terminate a process of a scanner driver communicating with the image processing apparatus according to acquisition of scan data of the document by the acquisition unit.

4. A control method for an information processing apparatus configured to communicate with an image processing apparatus, the control method comprising:

a first communication step of starting wireless communication by contacting the information processing apparatus to a port of the image processing apparatus;

a second communication step of starting wireless communication without contacting the information processing apparatus to a port of the image processing apparatus, wherein a transmission rate in the second communication step is higher than a transmission rate in the first communication step;

an acquisition step of acquiring, via wireless communication in the first communication step, information from the image processing apparatus to determine whether a scan service provided by the image processing apparatus comprising a scanner unit can be used; and a display step of displaying an icon indicating that the scan service can be accessed when it is determined that the scan service can be used;

wherein the acquisition step acquires, after a scan process is executed by the image processing apparatus in response to an operator issuing a scan instruction, scan data of a document scanned by the scan process via wireless communication in the second communication step, and the image processing apparatus deletes the scan data.

5. The method according to claim 4, wherein the display step switches and displays from the displayed icon indicating that the scan service can be communicated to the icon indicating that the scan service cannot be communicated according to disconnection of wireless communication in the first communication step.

6. The apparatus according to claim 4, wherein the information processing apparatus is configured to terminate a process of a scanner driver communicating with the image processing apparatus according to acquisition of scan data of the document in the acquisition step.

7. A non-transitory computer-readable storage medium storing a computer program configured to cause a computer to execute a control method for an information processing apparatus configured to communicate with an image processing apparatus, the control method comprising:

a first communication step of starting wireless communication by contacting the information processing apparatus to a port of the image processing apparatus;

a second communication step of starting wireless communication without contacting the information processing apparatus to a port of the image processing apparatus, wherein a transmission rate in the second communication step is higher than a transmission rate in the first communication step;

an acquisition step of acquiring, via wireless communication in the first communication step, information from the image processing apparatus to determine whether a scan service provided by the image processing apparatus comprising a scanner unit can be used; and a display step of displaying an icon indicating that the scan service can be accessed when it is determined that the scan service can be used;

wherein the acquisition step acquires, after a scan process is executed by the image processing apparatus in response to an operator issuing a scan instruction, scan data of a document scanned by the scan process via wireless communication in the second communication step, and the image processing apparatus deletes the scan data.

8. The non-transitory computer-readable storage medium according to claim 7, wherein the display step switches and displays from the displayed icon indicating that the scan service can be communicated to the icon indicating that the scan service cannot be communicated according to disconnection of wireless communication in the first communication step.

9. The non-transitory computer-readable storage medium according to claim 7, wherein the information processing apparatus is configured to terminate a process of a scanner driver communicating with the image processing apparatus according to acquisition of scan data of the document in the acquisition step.

* * * * *